(12) United States Patent
Reddy et al.

(10) Patent No.: US 9,172,724 B1
(45) Date of Patent: Oct. 27, 2015

(54) LICENSING AND AUTHENTICATION WITH VIRTUAL DESKTOP MANAGER

(71) Applicant: AMERICAN MEGATRENDS, INC., Norcross, GA (US)

(72) Inventors: Bakka Reddy, Suwanee, GA (US); Joseprabu Inbaraj, Suwanee, GA (US); Divya Nettem, Suwanee, GA (US); Muthukkumaran Ramalingam, Chennai (IN)

(73) Assignee: AMERICAN MEGATRENDS, INC., Norcross, GA (US)

( * ) Notice: Subject to any disclaimer, the term of this patent is extended or adjusted under 35 U.S.C. 154(b) by 0 days.

(21) Appl. No.: 14/301,940

(22) Filed: Jun. 11, 2014

(51) Int. Cl.
*H04L 29/06* (2006.01)
*G06F 9/455* (2006.01)

(52) U.S. Cl.
CPC .............. *H04L 63/20* (2013.01); *G06F 9/45558* (2013.01); *H04L 63/10* (2013.01); *G06F 2009/45587* (2013.01)

(58) Field of Classification Search
CPC ....................................................... H04L 63/20
See application file for complete search history.

(56) References Cited

U.S. PATENT DOCUMENTS

| 2011/0184993 A1* | 7/2011 | Chawla et al. ................ 707/802 |
| 2011/0214176 A1* | 9/2011 | Burch et al. .................... 726/15 |
| 2014/0096134 A1* | 4/2014 | Barak et al. ....................... 718/1 |

* cited by examiner

*Primary Examiner* — Teshome Hailu
*Assistant Examiner* — Thanh Le
(74) *Attorney, Agent, or Firm* — Locke Lord LLP; Tim Tingkang Xia, Esq.

(57) ABSTRACT

A computer-implemented method for virtual desktop system to license and authenticate various user devices to access virtual desktop system, includes one or more of following operations: (a) establishing network connection between a user device and a virtual desktop manager, (b) receiving request from user device to obtain access token to access a target virtual desktop of a virtual machine, (c) verifying the user device registration and security policy, (d) generating a unique token with expiration by virtual desktop manager if user device is authorized, (e) providing unique token with expiration and security policy to user device, (f) establishing connection between user device and target virtual desktop of virtual machine using unique token with expiration and security policy, (g) verifying token with virtual desktop manager by virtual machine of target virtual desktop, and (h) allowing user device to access target virtual desktop of virtual machine if user device is authorized.

20 Claims, 3 Drawing Sheets

LICENSING AND AUTHENTICATION WITH VIRTUAL DESKTOP MANAGER

FIELD

The present disclosure relates generally to virtual desktop infrastructure, and particularly to licensing and authentication of a user device with a virtual desktop manager.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Remote desktop virtualization implementations operate as client/server computing environments. Application execution takes place on a virtual desktop of a virtual machine which is linked to the local client device over a network or a cloud using a remote display protocol through which the user interacts with applications. All applications and data used remain on the virtual machine with only display, keyboard, and mouse information communicated with the local client device which may be a conventional personal computer, a laptop computer, a thin client device, a tablet, or even a smartphone. A common implementation of this approach is to host multiple desktop operating system instances on a virtual machine hardware platform running a hypervisor. This is generally referred to as "Virtual Desktop Infrastructure" or "VDI".

Remote desktop virtualization is frequently used in the following scenarios: (a) In distributed environments with high availability requirements and where desk-side technical support is not readily available, such as branch office and retail environments, (b) in environments where high network latency degrades the performance of conventional client/server applications, (c) In environments where remote access and data security requirements create conflicting requirements that can be addressed by retaining all (application) data within the data center with only display, keyboard, and mouse information communicated with the remote client, (d) It is also used as a means of providing access to Windows applications on non-Windows endpoints including tablets, smart phones and non-Windows-based desktop PCs and laptops, and (e) Remote desktop virtualization is also used as a means of resource sharing, to provide low-cost desktop computing services in environments where providing every user with a dedicated desktop PC is either too expensive or otherwise unnecessary. The convenient access to the virtual desktops of the virtual machine also brings privacy and security risks to the virtual machines. In order to minimize the privacy and security risks to a corporation, and protect the privacy and security of the information stored in the virtual desktops of the virtual machine, it is desirable to authenticate any user devices attempting to connect to the virtual desktops of various virtual machines to gain access based on pre-stored information of all authorized user devices with a virtual desktop manager.

Therefore, an unaddressed need exists in the art to address the aforementioned deficiencies and inadequacies.

SUMMARY

In one aspect, the present disclosure relates to a virtual desktop system. In certain embodiments, the virtual desktop system includes: (a) one or more virtual machines, (b) one or more user devices, and (c) a virtual desktop manager. The virtual machines are configured to provide virtual desktops to various users. The user devices allow various users to access the virtual desktops through a network. The virtual desktop manager is configured to register the user devices, to assign and encrypt security policy to the registered user devices, and to manage the registered user devices' accesses to the virtual desktops of the virtual machines.

In certain embodiments, the virtual desktop manager includes (a) a virtual desktop storage, (b) a virtual desktop management interface, and (c) a virtual desktop management tool. In certain embodiments, the virtual desktop storage stores registration information, and encrypted security policy of the registered user devices. The virtual desktop management interface performs one or more of following operations: (a) receiving a registration request from a user device before the user device can access the virtual desktops for the first time, (b) receiving a request from a registered user device to access a target virtual desktop on a virtual machine, (c) sending a unique token with expiration and encrypted security policy to the registered user device, (d) receiving verification request from the virtual machine of the target virtual desktop, and (e) responding to verification request from the virtual machine of the target virtual desktop based on the security policy of the registered user device.

In certain embodiments, the virtual desktop management tool performs one or more following operations: (a) registering the user device upon receiving registration request from the user device by the virtual desktop management interface, (b) setting up security policy for the registered user device, (c) encrypting the security policy for the registered user device, (d) storing the registration information and encrypted security policy of the registered user device to the virtual desktop storage, (e) generating a unique token with expiration when the registered user device requests to access a target virtual desktop, (f) verifying the unique token with the virtual machine of the target virtual desktop, and (g) allowing the registered user device to access the target virtual desktop according to the security policy and the expiration.

In certain embodiments, each of the virtual machines is configured to perform one or more of following operations: (a) receiving virtual desktop access request along with a unique token with expiration from a registered user device, (b) verifying the unique token with the virtual desktop manager, and (c) establishing virtual desktop connection between the target virtual desktop and the registered user device if the registered user device is authenticated through verification, and (d) providing the target virtual desktop to the registered user device.

In certain embodiments, the various user devices include: (a) a thin client device, (b) a desktop computer, (c) a laptop computer, (d) a netbook computer, (e) a notebook computer, (f) a tablet computer, and (g) other network connected terminal devices. The security policy of the registered user devices includes the management of one or more of following functions of the user device: (a) audio recording and playback, (b) video recording and playback, (c) downloading and uploading files, (d) screen shots, (e) cutting and pasting content, and (f) accessing resources and applications from the virtual desktop.

In another aspect, the present disclosure relates to a computer-implemented method for a virtual desktop system to license and authenticate various users and various user devices to access a virtual desktop provided from a virtual machine. In certain embodiments, the computer-implemented method includes one or more of following operations:

(a) establishing network connection between a registered user device and a virtual desktop manager at the request of the registered user device, (b) receiving, at the virtual desktop manager, a request from the registered user device to obtain an access token to access a target virtual desktop of a virtual machine, (c) verifying the user device registration and security policy by the virtual desktop manager, and continuing to next operation if the registered user device is registered and has license and access permission, otherwise, rejecting the user device access to the target virtual desktop, (d) generating a unique token with expiration by the virtual desktop manager, (e) providing the unique token with expiration and security policy to the registered user device, (f) establishing connection between the registered user device and the target virtual desktop of the virtual machine using the unique token with expiration and security policy, (g) verifying the unique token with the virtual desktop manager by the virtual machine of the target virtual desktop, and (h) establishing the virtual desktop connection from the target virtual desktop to the registered user device, and (i) allowing the registered user device to access the target virtual desktop of the virtual machine if the registered user device is authenticated through verification.

In certain embodiments, the virtual desktop system includes: (a) one or more virtual machines, (b) one or more user devices, and (c) a virtual desktop manager. The virtual machines are configured to provide virtual desktops to various users. The user devices allow various users to access the virtual desktops through a network. The virtual desktop manager is configured to register the user devices, to assign and encrypt security policy to the registered user devices, and to manage the access to the virtual desktop services by the registered user devices.

In certain embodiments, the computer-implemented method also includes one or more of following operations: (a) registering each of the user devices before these user devices can access their target virtual desktops for the first time, (b) setting up the license and access permission for each of the registered user devices, (c) storing registration, license and access permission information of the registered user devices, (d) verifying of the registered user devices when the registered user devices attempt to access their target virtual desktops, and (e) granting license and access permission to the registered user devices to access their target virtual desktops.

In certain embodiments, the virtual desktop manager has: (a) a virtual desktop management tool, and (b) at least one virtual desktop storage. The virtual desktop management tool allows an administrator to manage the registration, license and access permission of the registered user devices. The at least one virtual desktop storage stores the registration, license and access permission of the registered user devices.

In certain embodiments, the computer-implemented method also includes one or more of following operations: (a) registering each of the registered user devices by using the virtual desktop management tool, (b) setting up license and access permission for each of the registered user devices, (c) storing registration information for each of the registered user devices in the at least one virtual desktop storage, and (d) storing license and access permission for each of the registered user devices in the at least one virtual desktop storage.

In certain embodiments, the registration information of a user device includes one or more of: (a) the user device type, (b) the MAC address of the user device, (c) the name of the authorized user, (d) the mobile phone number of the authorized user, (e) the email address of the authorized user, (f) the security level of the authorized user, (g) the authorized username, and (h) the authorized password.

In certain embodiments, the expiration time is determined by one or more of following factors: (a) the purpose of the virtual desktop access, (b) the security level of the authorized user, (c) the type of user device used, (d) the password of the authorized user, (e) the IP address of the user device, and (f) the MAC address of the user device.

In certain embodiments, the various user devices include: (a) a thin client device, (b) a desktop computer, (c) a laptop computer, (d) a netbook computer, (e) a notebook computer, (f) a tablet computer, and (g) other network connected terminal devices. The security policy of the registered user devices includes the management of one or more of following functions of the user device: (a) audio recording and playback, (b) video recording and playback, (c) downloading and uploading files, (d) screen shots, (e) texting and instant messaging, (f) cutting and pasting content, and (g) accessing resources and applications from the virtual desktop.

In yet another aspect, the present disclosure relates to a non-transitory computer storage medium. The non-transitory computer storage medium stores certain computer-executable instructions. When these computer-executable instructions are executed by a processor of a virtual desktop system, cause the processor to perform one or more of following operations to license and authenticate a user and a user device to access a virtual desktop of a virtual machine of the virtual desktop system: (a) establishing network connection between a registered user device and a virtual desktop manager at the request of the registered user device, (b) receiving, at the virtual desktop manager, a request from the registered user device to obtain an access token to access a target virtual desktop of a virtual machine, (c) verifying the user device registration and security policy by the virtual desktop manager, and continuing to next operation if the registered user device is registered and has license and access permission, otherwise, rejecting the user device access to the target virtual desktop, (d) generating a unique token with expiration by the virtual desktop manager, (e) providing the unique token with expiration and security policy to the registered user device, (f) establishing connection between the registered user device and the target virtual desktop of the virtual machine using the unique token with expiration and security policy, (g) verifying the unique token with the virtual desktop manager by the virtual machine of the target virtual desktop, and (h) establishing the virtual desktop connection from the target virtual desktop to the registered user device, and (i) allowing the registered user device to access the target virtual desktop of the virtual machine if the registered user device is authenticated through verification.

The non-transitory computer storage medium also stores additional computer-executable instructions for performing one or more of following operations: (a) registering each of the registered user devices by using a virtual desktop management tool, (b) setting up license and access permission for each of the registered user devices, (c) storing registration information for each of the registered user devices in a virtual desktop storage, and (d) storing license and access permission for each of the registered user devices in the virtual desktop storage.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings FIGS. 1-3. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The present disclosure will now be described more fully hereinafter with reference to the accompanying drawings, FIGS. 1-3, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art. Like numbers refer to like elements throughout.

Figure 1:
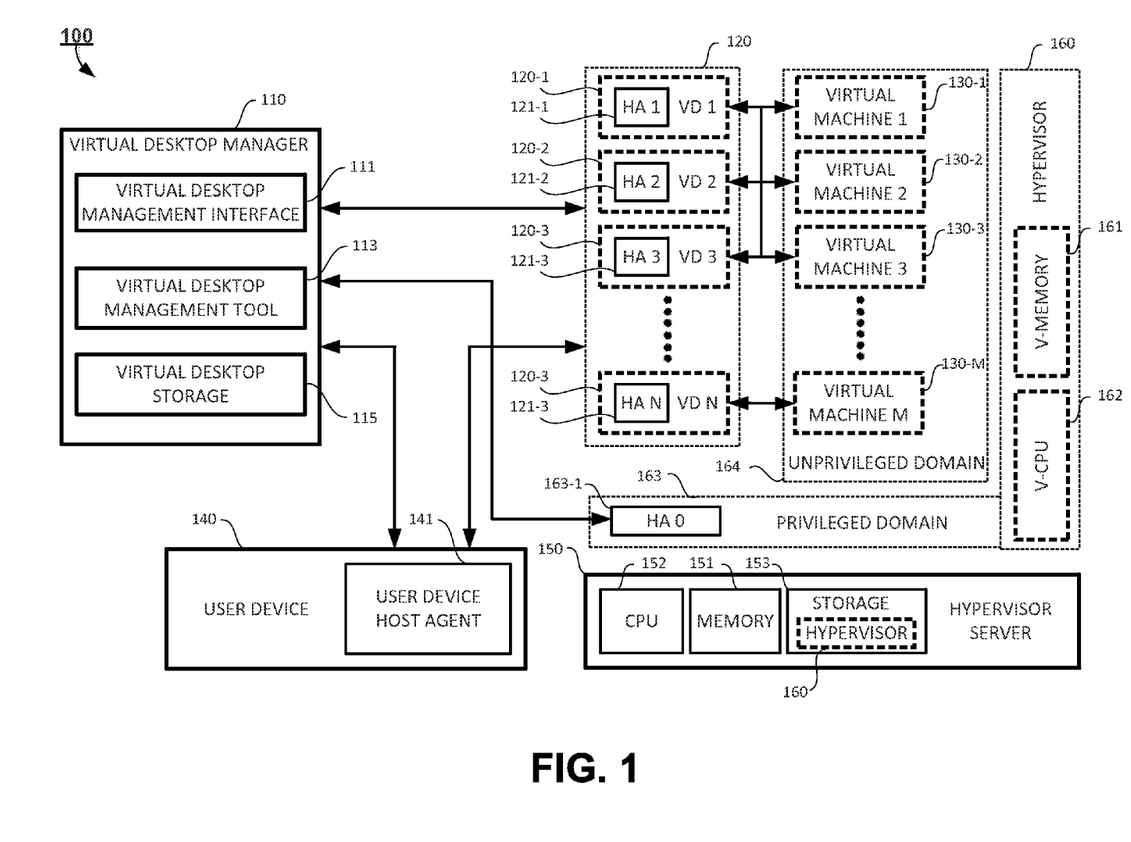
FIG. 1 schematically depicts a virtual desktop system according to certain embodiments of the present disclosure.

In one aspect, the present disclosure relates to a virtual desktop system 100 as shown in FIG. 1 according to certain embodiments of the present disclosure. The virtual desktop system 100 includes: (a) one or more of virtual machines 130, (b) one or more virtual desktops 120, (c) a virtual desktop manager 110, and (d) at least one user device 140. The virtual desktop system 100 also includes a hypervisor 160, running on a hypervisor server 150. In certain embodiments, the hypervisor server 150 includes: (a) a CPU 152, (b) memory 151, and a storage 153. A hypervisor 160 is stored in the storage 153. The CPU 152 is a host processor which is configured to control operation of the hypervisor server 150. The CPU 152 can execute the hypervisor 160 or other applications of the hypervisor server 150. In certain embodiments, the hypervisor server 150 may run on more than one CPU as the host processor, such as two CPUs, four CPUs, eight CPUs, or any suitable number of CPUs. The memory 114 can be a volatile memory, such as the random-access memory (RAM), for storing the data and information during the operation of the hypervisor server 150. The memory 151 can be a volatile memory, such as the random-access memory (RAM), for storing the data and information during the operation of the hypervisor server 150. The storage 153 is a non-volatile data storage media for storing the hypervisor 160 and other applications of the hypervisor server 150. Examples of the storage 116 may include flash memory, memory cards, USB drives, hard drives, floppy disks, optical drives, or any other types of data storage devices.

The hypervisor 160 is a program that allows multiple VM instances to run simultaneously and share a single hardware host, such as the hypervisor server 150. The hypervisor 160, when executed at the CPU 152, implements hardware virtualization techniques and allows one or more operating systems or other applications to run concurrently as guests of one or more virtual machines on the host server (i.e. the hypervisor server 150). The hypervisor 160 allows each user to run an operating system instance as a VM. In certain embodiments, the hypervisor 160 can be of various types and designs, such as MICROSOFT HYPER-V, XEN, VMWARE ESX, or other types of hypervisors.

As shown in FIG. 1, when the hypervisor instance 160 runs on the hypervisor server 150, the hypervisor 160 emulates one or more virtual computer machine, including a virtual CPU 162, and a virtual memory 161. In certain embodiments, the hypervisor 160 can have a privileged domain 163 and an unprivileged domain 164. One or more VMs 130-1, 130-2, 130-3, . . . , and 130-M can operate in the unprivileged domain 144 of the hypervisor 160. Each VM 130-$i$, i=1, 2, . . . , M can run a virtual machine operation system (VMOS), such as WINDOWS or LINUX. For brevity, unless otherwise noted, a VM and the VMOS run in that VM are collectively referred to as a VM (such as each VM 130-$i$, i=1, 2, . . . , M shown in FIG. 1).

In one embodiment, the VMs 130 include M virtual machines 130, and they are a first virtual machine 130-1, a second virtual machine 130-2, the third virtual machine 130-3, . . . , and a M-th virtual machine 130-M. In one embodiment, the virtual desktops include N virtual desktops 120, and they are a first virtual desktop 120-1, a second virtual desktop 120-2, a third virtual desktop 120-3, . . . , and a N-th virtual desktop 120-N. In certain embodiments, one or more of virtual desktops are running on each of the virtual machines. In one embodiment, each virtual desktop 120-I is running on each of a corresponding virtual machine 130-I. In another embodiment, each virtual desktop 120-I runs on one or more virtual machines 130.

The virtual machines 130-1, 130-2, . . . , and 130-M provides virtual desktops 120-1, 120-2, . . . , and 120-N to various user devices used by various users. The virtual desktops 120-1, 120-2, . . . , and 120-N from the virtual machines 130-1, 130-2, . . . , and 130-M are managed by the virtual desktop manager 110 between the user device 140 and the various virtual desktops 120-1, 120-2, . . . , and 120-N.

In certain embodiments, the user device 140 has a user device host agent 141 in communication with the virtual desktop manager 110. Each of the virtual desktops 120-$x$ has a host agent 121-$x$, and these host agents 121-$x$ are used to communicate with the virtual desktop manager 110, respectively. The virtual desktop 120-$x$ is provided to the user device 140 through a communication link between the virtual machine 130-$x$ and the user device 140.

In certain embodiments, the user device 140 has a user device host agent 141 in communication with the virtual desktop manager 110. The privilege domain 163 of the hypervisor 160 has a host agent 163-1. The host agent 163-1 is used to communicate with the virtual desktop manager 110. The virtual desktop 120-$x$ will no longer be provided with the host agents 121-$x$, x=1, 2, 3, . . . , N. The host agent 163-1 replaces the host agents 121-$x$, and performs the same functions for the host agents 121-$x$. The virtual desktop 120-$x$ is provided to the user device 140 through a communication link between the virtual machine 130-$x$ and the user device 140.

In certain embodiments, the user device 140 can be: (a) a thin client device, (b) a desktop computer, (c) a laptop computer, (d) a netbook computer, (e) a notebook computer, (f) a tablet computer, and/or (g) other network connected terminal devices. In certain embodiments, the user device host agent 141 may be a software module such as a program for a computer or an application for a mobile device. In certain embodiments, the user device host agent 141 can a module that includes both hardware (e.g., a controller or a processor) and software (e.g., firmware). The user of the user device 140 can download from a website for a computer or from an application store for any mobile devices.

In order to ensure the privacy and security of the virtual desktops and the virtual machines, before a user device 140 can connect to any of the virtual desktops, the user device 140 is required to register with the virtual desktop manager 110. When a user uses the user device 140 the first time, the host agent 141 can ask the user to register the user device 140. In certain embodiments, the user of the user device 140 is required to register the user device 140 with a virtual desktop manager 110 only once. During the registration process, the user provides registration information of the user device 140. The registration information of the user device 140 may include one or more of: (a) the user device type, (b) the MAC address of the user device, (c) the name of the authorized user, (d) the mobile phone number of the authorized user, (e) the email address of the authorized user, (f) the security level of the authorized user, (g) the authorized username, and (h) the authorized password. Additional information may also be requested depending on the configuration of the virtual desktops and the virtual machines.

In certain embodiments, the virtual desktop manager 110 includes: (a) a virtual desktop management interface 111, (b) a virtual desktop management tool 113, and (c) a virtual desktop storage 115. The virtual desktop storage 115 stores registration information, and encrypted security policy of the registered user devices.

The virtual desktop management interface 111 performs one or more of following operations: (a) receiving a registration request from a user device 140 before the user device 140 can access a target virtual desktop for the first time, (b) receiving a request from a registered user device 140 to access a target virtual desktop 120 on a virtual machine 130, (c) sending a unique token with expiration and encrypted security policy to the registered user device 140, (d) receiving verification request from the virtual machine 130 of the target virtual desktop 120, and (e) responding to verification request from the virtual machine 130 of the target virtual desktop 130 based on the security policy of the registered user device 140.

In certain embodiments, the expiration time is determined by one or more of following factors: (a) the purpose of the virtual desktop access, (b) the security level of the authorized user, (c) the type of user device used, (d) the password of the authorized user, (e) the IP address of the user device, and (f) the MAC address of the user device. Once the registered user device 140 receives the unique token and the encrypted security policy, the unique token will be used to access the target virtual desktop 120 of the virtual machine 130, and the security policy will remain on the registered user device 140 until the end of the access to the target virtual desktop 120.

In certain embodiments, the virtual desktop management tool performs one or more following operations: (a) registering the user device 140 upon receiving registration request from the user device 140 from the virtual desktop management interface 111, (b) setting up security policy for the registered user device 140, (c) encrypting the security policy for the registered user device, (d) storing the registration information and encrypted security policy of the registered user device to the virtual desktop storage, (e) generating a unique token with expiration when the registered user device requests to access a target virtual desktop 120, (f) verifying the unique token with the virtual machine 130 of the target virtual desktop 120, and (g) allowing the registered user device 140 to access the target virtual desktop 120 according to the security policy and the expiration.

Figure 2:
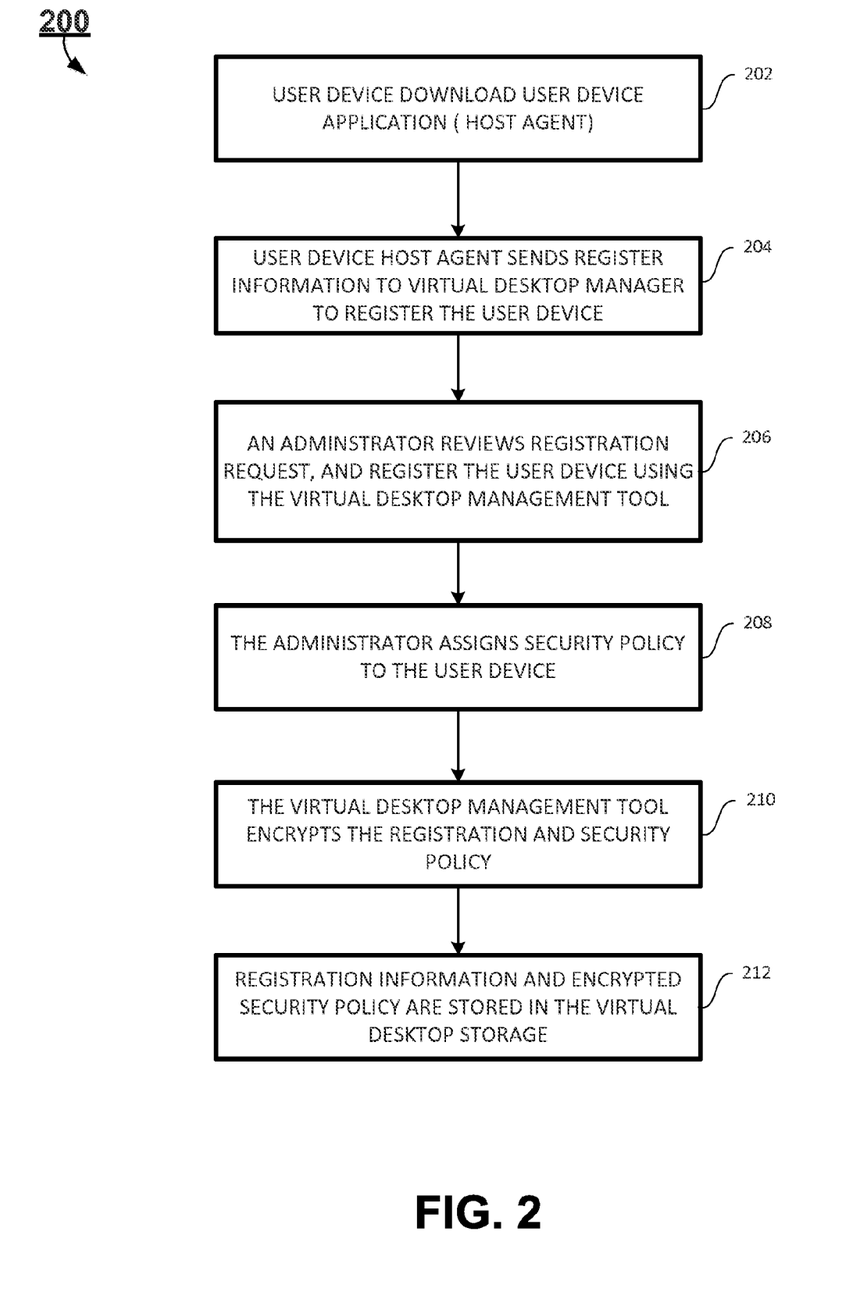
FIG. 2 shows a flow chart of a user device registration process according to certain embodiments of the present disclosure.

Referring now to FIG. 2, a flow chart of registration process of a user device 140 is shown according to certain embodiments of the present disclosure.

At operation 202, the user uses an un-registered user device 140 to download a host agent 141 (e.g. a program for a computer, or an application for a mobile device).

At operation 204, the user device host agent 141 of the user device 140 sends a registration request to a virtual desktop manager 110 to register the user device 140 for the first time. The user provides user device registration information to the virtual desktop manager 110.

At operation 206, in one embodiment, the registration process can be performed by an administrator at the virtual desktop manager 110 by reviewing the registration request and registering the user device 140 manually. The registration process can also be performed automatically by using a virtual desktop management tool 113.

At operation 208, if the user device 140 is approved for virtual desktops, then the administrator or the virtual desktop management tool 113 assigns a security policy to the user devices. Otherwise, if the user device 140 is not approved for virtual desktops, the registration is denied and the user is notified of such registration denial.

At operation 210, the virtual desktop management tool 113 encrypts the registration information and security policy assigned.

At operation 212, the virtual desktop management tool 113 stores the encrypted registration information and security policy in a virtual desktop storage 115 of the virtual desktop manager 110, and the user device registration process is completed.

The security policy of a registered user device includes the management of one or more of following functions of the user device: (a) audio recording and playback, (b) video recording and playback, (c) downloading and uploading files, (d) screen shots, (e) texting and instant messaging, (f) cutting and pasting content, and (g) accessing resources and applications from the virtual desktop. Additional functionalities may also be limited by the security policy.

In another aspect, the present disclosure relates to a computer-implemented method for a virtual desktop system to license and authenticate various users and various user devices to access a virtual desktop of a virtual machine. In certain embodiments, the computer-implemented method includes one or more of following operations: (a) establishing network connection between a registered user device and a virtual desktop manager at the request of the registered user device, (b) receiving, at the virtual desktop manager, a request from the registered user device to obtain an access token to access a target virtual desktop of a virtual machine, (c) verifying the user device registration and security policy by the virtual desktop manager, and continuing to next operation if the registered user device is registered and has license and access permission, otherwise, rejecting the user device access to the target virtual desktop, (d) generating a unique token with expiration by the virtual desktop manager, (e) providing the unique token with expiration and security policy to the registered user device, (f) establishing connection between the registered user device and the target virtual desktop of the virtual machine using the unique token with expiration and security policy, (g) verifying the unique token with the virtual desktop manager by the virtual machine of the target virtual desktop, and (h) establishing the virtual desktop connection from the target virtual desktop to the registered user device, and (i) allowing the registered user device to access the target virtual desktop of the virtual machine if the registered user device is authenticated through verification.

In certain embodiments, the virtual desktop system includes: (a) one or more virtual machines, (b) one or more user devices, and (c) a virtual desktop manager. Each of the virtual machines is configured to provide one or more virtual desktops to various users. The user devices allow various users to access the virtual desktops through a network. The virtual desktop manager is configured to register the user devices, to assign and encrypt security policy to the registered user devices, and to manage the access to the virtual desktop services by the registered user devices.

In certain embodiments, the computer-implemented method also includes one or more of following operations: (a) registering each of the user devices before these user devices can access their target virtual desktops for the first time, (b) setting up the license and access permission for each of the registered user devices, (c) storing registration, license and access permission information of the registered user devices, (d) verifying of the registered user devices when the registered user devices attempt to access their target virtual desktops, and (e) granting license and access permission to the registered user devices to access their target virtual desktops.

Figure 3:
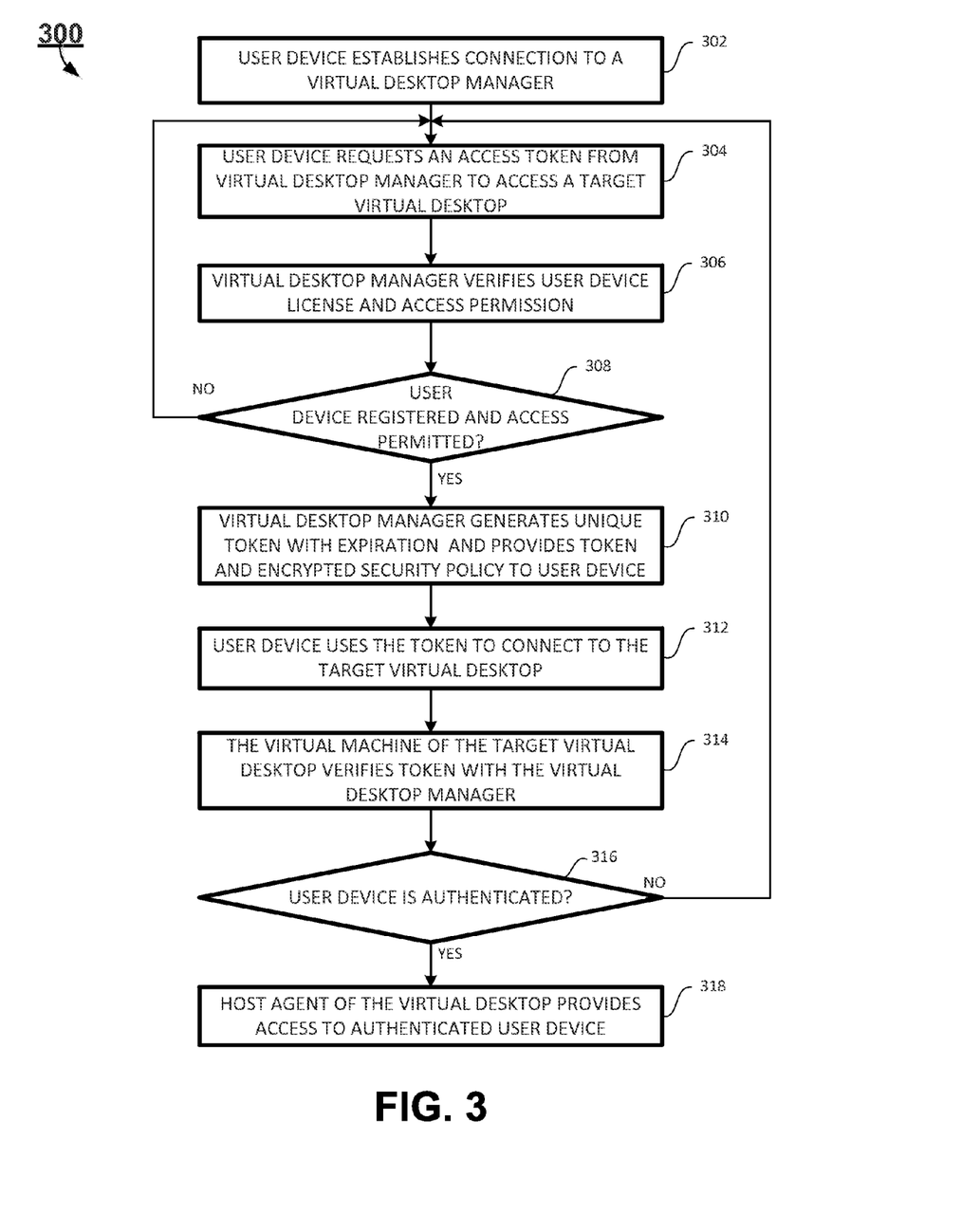
FIG. 3 shows a flow chart of a user's licensing and authentication process according to certain embodiments of the present disclosure.

Referring now to FIG. 3, a flow chart of a user device 140 obtaining licensing and authentication process is shown according to certain embodiments of the present disclosure.

At operation 302, the user device 140 sends a network connection request to a virtual desktop management interface 111 of a virtual desktop manager 110 to establish communication between the user device 140 and the virtual desktop manager 110. If the user device is not registered, then the virtual desktop management interface 111 of the virtual desktop manager 110 will request the user device 140 to register first. In certain embodiments, the user device 140 will download a user device host agent 141 from the virtual desktop manager 110. The user device host agent 141 can execute the registration process with the virtual desktop manager 110.

At operation 304, once the connection between the registered user device 140 and the virtual desktop manager 110 is established, the registered user device 140 sends a request to virtual desktop manager 110 to ask for an access token to access a target virtual desktop 120 of a virtual machine 130. The request carries certain unique information about the registered user device 140.

At operation 306, the virtual desktop management tool 113 of the virtual desktop manager 110 verifies license and access permission information of the registered user device 140. The virtual desktop management tool 113 of the virtual desktop manager 110 analyses the request, retrieves the identifying information of the registered user device 140 and verifies with the information stored in a virtual desktop storage 115 of the virtual desktop manager 110.

At query operation 308, the virtual desktop management tool 113 of the virtual desktop manager 110 checks if the registered user device 140 has license and access permission as set up during the registration process. If the registered user device 140 is granted license and access permission, then continue to operation 310. Otherwise, if the registered user device 140 is not granted license and access permission, the request to access the virtual desktop 120 of the virtual machine 130 is denied and the operation goes back to operation 304.

At operation 310, the virtual desktop management tool 113 of the virtual desktop manager 110 generates a unique token with expiration and provides the unique token to the user device. In certain embodiments, the expiration time is determined by one or more of following factors: (a) the purpose of the virtual desktop access, (b) the security level of the authorized user, (c) the type of user device used, (d) the password of the authorized user, (e) the IP address of the user device, and (f) the MAC address of the user device. For example, if the user uses the virtual desktop to perform his/her work or telecommute, then the expiration should be longer such as 8 to 10 hours. If the user uses the virtual desktop to look on some files, then the expiration time should be shorter. If the user is an IT professional, his/her access should be longer. If the user is allowed to access the virtual desktop server as a guest, then the expiration time should be shorter. If the device used is an access terminal or computer installed in user's work place, the expiration time may be longer. If the device used is a mobile device or a personal device, then the expiration time should be shorter. All these expiration time should be set up according to a security policy enforced at work place, and stored in the virtual desktop storage 115 of the virtual desktop manager 110.

In certain embodiments, the virtual desktop manager 110 transmits the unique token and the related security policies to the user device 140. The user device host agent 141 receives the token and the related security policies and enforces the related security policies received through the firmware of the user device 140. For example, if the user device 140, in accordance with the related security policies, is not allowed to take pictures using its camera function, the user device host agent 141 transmits a command to the user device 140 to disable the driver of the camera function. If the user device 140, in accordance with the related security policies, is not allowed to record using its microphone function, the user device host agent 141 transmits a command to the user device 140 to disable the driver of the microphone function.

For example, if the user uses a registered user device 140 which is a laptop computer with its MAC address authorized for telecommuting, and the laptop computer 140 is connected to the network through a secure firewall, the security policy should allow the user to use the laptop computer just like the user is using the laptop computer in office. The laptop computer should not be restricted to access any information sources, to view and edit any files the user is authorized to view and edit when the user is actually working in office, other than having an expiration time for the connection.

If the user uses another registered user device 140, for example, a mobile device, a smart phone, certain restrictions may be imposed on the usages of the user device 140 for security reasons. For example, when the user access certain files, the user may be restricted and may not save a local copy, mail/forward certain files to another person, take a snapshot by using the camera function, record a conversation through the phone, and delete certain files.

If the user is one of the high level management team, or an IT professional, the user devices may have fewer restrictions than other employees within an organization. These people are authorized through their usernames and passwords, and allowed to access wider ranges of files and documents than other ordinary employees within the organization. For example, the management team member or IT professionals are allowed to access, view, edit, delete, make copy to certain files, while other ordinary employees are only allowed to view and not allowed to edit, delete, make copy to certain files. For certain users, the user device 140 is not allowed access to certain files.

At operation 312, once the registered user device 140 receives the unique token, the user can use the unique token to connect to the virtual desktop 120 of the virtual machine 130.

At operation 314, the virtual machine 130 of the virtual desktop 120 sends a verification request to the virtual desktop management interface 111 of the virtual desktop manager 110 to verify the unique token received, to ascertain the registered user device 140 is authenticated.

At query operation 316, if the registered user device 140 is authenticated, the operation continues to operation 318. Otherwise, if the registered user device 140 is not authenticated, the request to access the virtual desktop 120 of the virtual machine 130 is denied and the operation goes back to operation 304.

At the operation 318, in one embodiment, once the registered user device 140 is authenticated, the virtual machine 130 of the virtual desktop 120 instructs the host agent 121 of the virtual desktop 120 to provide virtual desktop 120 to the registered user device 140. In another embodiment, once the registered user device 140 is authenticated, the virtual machine 130 of the virtual desktop 120 instructs the host agent (HA 0) 163-1 of the hypervisor 160 to provide virtual desktop 120 to the registered user device 140.

In yet another aspect, the present disclosure relates to a non-transitory computer storage medium. The non-transitory computer storage medium stores certain computer-executable instructions. When these computer-executable instructions are executed by a processor of a virtual desktop system, cause the processor to perform one or more of following operations to license and authenticate a user and a user device to access a virtual desktop of a virtual machine of the virtual desktop system: (a) establishing network connection between a registered user device and a virtual desktop manager at the request of the registered user device, (b) receiving, at the virtual desktop manager, a request from the registered user device to obtain an access token to access a target virtual desktop of a virtual machine, (c) verifying the user device registration and security policy by the virtual desktop manager, and continuing to next operation if the registered user device is registered and has license and access permission, otherwise, rejecting the user device access to the target virtual desktop, (d) generating a unique token with expiration by the virtual desktop manager, (e) providing the unique token with expiration and security policy to the registered user device, (f) establishing connection between the registered user device and the target virtual desktop of the virtual machine using the unique token with expiration and security policy, (g) verifying the unique token with the virtual desktop manager by the virtual machine of the target virtual desktop, and (h) establishing the virtual desktop connection from the target virtual desktop to the registered user device, and (i) allowing the registered user device to access the target virtual desktop of the virtual machine if the registered user device is authenticated through verification.

The non-transitory computer storage medium also stores additional computer-executable instructions for performing one or more of following operations: (a) registering each of the registered user devices by using a virtual desktop management tool, (b) setting up license and access permission for each of the registered user devices, (c) storing registration information for each of the registered user devices in a virtual desktop storage, and (d) storing license and access permission for each of the registered user devices in the virtual desktop storage.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A virtual desktop system, comprising:
a plurality of virtual machines operating on a hypervisor server, configured to provide a plurality of virtual desktops to a plurality of users;
a plurality of user devices configured to allow the plurality of users to access the plurality of virtual desktops through a network; and
a virtual desktop manager operating on the hypervisor server, configured to register the plurality of user devices, to assign and encrypt security policy to the plurality of registered user devices, to manage the access to the plurality of virtual desktops by the plurality of registered user devices, and to generate a unique token with expiration,
wherein an expiration time of the unique token is determined by factors including a security level of an authorized user.

2. The virtual desktop system of claim 1, wherein the virtual desktop manager comprises a virtual desktop storage operating on the hypervisor server and configured to store registration information, and encrypted security policy of the plurality of registered user devices.

3. The virtual desktop system of claim 2, wherein the virtual desktop manager further comprises a virtual desktop management interface operating on the hypervisor server and configured to perform one or more of following operations:
receiving a registration request from a user device before the user device can access the plurality of virtual desktops for the first time;
receiving a request from a registered user device to access a target virtual desktop on a virtual machine;
sending the unique token with expiration and encrypted security policy to the registered user device;
receiving verification request from the virtual machine of the target virtual desktop; and
responding to verification request from the virtual machine of the target virtual desktop based on the security policy of the registered user device.

4. The virtual desktop system of claim 3, wherein the virtual desktop manager further comprises a virtual desktop management tool operating on the hypervisor server and configured to perform one or more of following operations:
registering the user device upon receiving registration request from the user device by the virtual desktop management interface;
setting up security policy for the registered user device;
encrypting the security policy for the registered user device;
storing the registration information and encrypted security policy of the registered user device to the virtual desktop storage;
generating the unique token with expiration when the registered user device requests to access the target virtual desktop;
verifying the unique token with the virtual machine of the target virtual desktop; and
allowing the registered user device to access the target virtual desktop according to the security policy and the expiration.

5. The virtual desktop system of claim 4, wherein the plurality of virtual machine operating on the hypervisor server is configured to perform one or more of following operations:
receiving virtual desktop access request along with the unique token with expiration from a registered user device;
verifying the unique token with the virtual desktop manager;
establishing virtual desktop connection to the registered user device if the registered user device is authenticated through verification; and
providing the target virtual desktop to the registered user device.

6. The virtual desktop system of claim 1, wherein the plurality of user devices comprises at least one of:
a thin client device;
a desktop computer;
a laptop computer;
a netbook computer;
a notebook computer;
a tablet computer;
a smartphone; and
other network connected terminal devices.

7. The virtual desktop system of claim 1, wherein the security policy comprises the management of one or more of following functions of the user device:
audio recording and playback;

video recording and playback;
downloading and uploading files;
screen shots;
cutting and pasting content; and
accessing resources and applications from the virtual desktop.

8. A computer-implemented method for a virtual desktop system to license and authenticate a plurality of user devices to access a plurality of virtual desktops, comprising following operations:
establishing network connection between a registered user device and a virtual desktop manager at the request of the registered user device;
receiving, at the virtual desktop manager, a request from the registered user device to obtain an access token to access a target virtual desktop of a virtual machine from the virtual desktop manager;
verifying user device registration and security policy by the virtual desktop manager, and continuing to next operation if the registered user device is registered and has license and access permission, otherwise, rejecting the user device access to the target virtual desktop;
generating a unique token with expiration by the virtual desktop manager, wherein an expiration time of the unique token is determined by factors including a security level of an authorized user;
providing the unique token with expiration and security policy to the registered user device;
establishing connection between the registered user device and the virtual machine of the target virtual desktop using the unique token with expiration and security policy;
verifying the unique token with the virtual desktop manager by the virtual machine of the target virtual desktop;
establishing the virtual desktop connection from the target virtual desktop to the registered user device; and
allowing the registered user device to access the target virtual desktop of the virtual machine if the registered user device is authenticated through verification.

9. The computer-implemented method of claim 8, wherein the virtual desktop system comprises:
a plurality of virtual machines operating on a hypervisor server, configured to provide a plurality of virtual desktops to a plurality of users;
a plurality of user devices configured to allow the plurality of users to access the plurality of virtual desktops through a network; and
a virtual desktop manager operating on the hypervisor server, configured to register the plurality of user devices, to assign and encrypt security policy to the plurality of registered user devices, and to manage the access to the plurality of virtual desktops by the plurality of registered user devices.

10. The computer-implemented method of claim 9, further comprising following operations:
registering each of the plurality of user devices before the plurality of user devices can access the plurality of target virtual desktops for the first time;
setting up the license and access permission for each of the plurality of the registered user devices;
storing registration, license and access permission information of the plurality of registered user devices;
verifying the plurality of registered user devices when the plurality of registered user devices attempt to access their target virtual desktops; and
granting license and access permission to the plurality of registered user devices to access the plurality of virtual desktops.

11. The computer-implemented method of claim 10, wherein the virtual desktop manager comprises:
a virtual desktop management tool configured to allow an administrator to manage the registration, license and access permission of the plurality of registered user devices; and
at least one virtual desktop storage operating on the hypervisor server, configured to store the registration, license and access permission of the plurality of registered user devices.

12. The computer-implemented method of claim 11, further comprising following operations:
registering each of the plurality of registered user devices by using the virtual desktop management tool;
setting up license and access permission for each of the plurality of the registered user devices;
storing registration information for each of the plurality of registered user devices in the at least one virtual desktop storage; and
storing license and access permission for each of the plurality of the registered user devices in the at least one virtual desktop storage.

13. The computer-implemented method of claim 8, wherein registration information of the user device comprises at least one of:
a user device type;
an MAC address of the user device;
a name of the authorized user;
a mobile phone number of the authorized user;
an email address of the authorized user;
a security level of the authorized user;
a username of the authorized user; and
a password of the authorized user.

14. The computer-implemented method of claim 8, wherein the expiration time is further determined by one or more of following factors:
a purpose of the virtual desktop access;
a type of user device used;
a password of the authorized user;
an IP address of the user device; and
an MAC address of the user device.

15. The computer-implemented method of claim 8, wherein the plurality of user devices comprises at least one of:
a thin client device;
a desktop computer;
a laptop computer;
a netbook computer;
a notebook computer;
a tablet computer;
a smartphone; and
other network connected terminal devices.

16. The computer-implemented method of claim 8, wherein the security policy comprises the management of one or more of following functions of the user device:
audio recording and playback;
video recording and playback;
downloading and uploading files;
screen shots;
texting and instant messaging;
cutting and pasting content; and
accessing resources and applications from the virtual desktop.

17. A non-transitory computer storage medium having computer-executable instructions stored thereon which, when executed by a processor of a virtual desktop system, cause the processor to perform one or more of following operations to license and authenticate a plurality user devices to access a plurality of virtual desktops of the virtual desktop system:

establishing network connection between a registered user device and a virtual desktop manager at the request of the registered user device;

receiving, at the virtual desktop manager, a request from the registered user device to obtain an access token to access a target virtual desktop of a virtual machine from the virtual desktop manager;

verifying the user device registration and security policy by the virtual desktop manager, and continuing to next operation if the registered user device is registered and has license and access permission, otherwise, rejecting the user device access to the target virtual desktop;

generating a unique token with expiration by the virtual desktop manager, wherein an expiration time of the unique token is determined by factors including a security level of an authorized user;

providing the unique token with expiration and security policy to the registered user device;

establishing connection between the registered user device and the virtual machine of the target virtual desktop using the unique token with expiration and security policy;

verifying the unique token with the virtual desktop manager by the virtual machine of the target virtual desktop;

establishing the virtual desktop connection from the target virtual desktop to the registered user device; and     allowing the registered user device to access the target virtual desktop of the virtual machine if the registered user device is authenticated through verification.

18. The non-transitory computer storage medium of claim 17, further comprising computer-executable instructions to perform one or more of following operations:

registering each of the plurality of user devices by using a virtual desktop management tool;

setting up license and access permission for each of the plurality of the registered user devices;

storing registration information for each of the plurality of registered user device in a virtual desktop storage; and     storing license and access permission for each of the plurality of the registered user devices in the virtual desktop storage.

19. The non-transitory computer storage medium of claim 18, wherein the virtual desktop system comprises     a plurality of virtual machines operating on a hypervisor server, configured to provide a plurality of virtual desktops to a plurality of users;

a plurality of user devices configured to allow the plurality of users to access the plurality of virtual desktops through a network; and     a virtual desktop manager operating on the hypervisor server, configured to register the plurality of user devices, to assign and encrypt security policy to the plurality of registered user devices, and to manage the access to the plurality of virtual desktops by the plurality of registered user devices.

20. The non-transitory computer storage medium of claim 19, wherein the virtual desktop manager comprises:

a virtual desktop management tool operating on the hypervisor server, configured to allow an administrator to manage the registration, license and access permission of the plurality of registered user devices;

at least one virtual desktop storage operating on the hypervisor server, configured to store the registration, license and access permission of the plurality of registered user devices; and     a virtual desktop management interface operating on the hypervisor server, configured to register each of the plurality of user devices, to receive request from a registered user device to access a target virtual desktop on a virtual machine, to send the unique token with expiration and encrypted security policy to the registered user device in response, and to receive verification request from the virtual machine of the target virtual desktop when the registered user device sends request to the virtual machine to access the target virtual desktop.

\* \* \* \* \*